United States Patent
Liu et al.

(10) Patent No.: US 10,333,784 B2
(45) Date of Patent: *Jun. 25, 2019

(54) CLOUD SYSTEM ORDER AND CONFIGURATION USING CUSTOMIZED TEMPLATES

(71) Applicant: International Business Machines Corporation, Armonk, NY (US)

(72) Inventors: Su Liu, Austin, TX (US); Michael S. Ly, Austin, TX (US); Jorge D. Rodriguez, Austin, TX (US); Paul Tippett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 14/788,252

(22) Filed: Jun. 30, 2015

(65) Prior Publication Data
US 2017/0005864 A1    Jan. 5, 2017

(51) Int. Cl.
G06F 15/177 (2006.01)
H04L 12/24 (2006.01)
H04L 29/08 (2006.01)

(52) U.S. Cl.
CPC ...... H04L 41/0843 (2013.01); H04L 41/5054 (2013.01); H04L 67/1002 (2013.01); *H04L 41/5096* (2013.01)

(58) Field of Classification Search
CPC ............. H04L 41/0843; H04L 41/5054; H04L 41/5096; H04L 67/1002

(Continued)

(56) References Cited

U.S. PATENT DOCUMENTS 7,184,538 B1 * 2/2007 Doskow ............ H04L 63/0227
                                                                  370/352
8,775,272 B2 7/2014 Thomas
(Continued)

FOREIGN PATENT DOCUMENTS

EP        2530589 A2 * 12/2012 ......... G06F 9/45558
EP        2613542 A2    7/2013
WO   2007032021 A2    3/2007

OTHER PUBLICATIONS

List of IBM Patents or Patent Applications Treated as Related.
(Continued)

*Primary Examiner* — Tauqir Hussain
(74) *Attorney, Agent, or Firm* — Patterson + Sheridan, LLP

(57) ABSTRACT

The present disclosure relates to brokering requests for cloud computing resources between a user and multiple infrastructure providers. According to one embodiment, an infrastructure manager acting as a broker receives a template including configuration information for one or more servers. For each of the plurality of infrastructure providers, the infrastructure manager generates an infrastructure provider-specific specification based on the generic template, transmits the provider-specific specification file to the infrastructure provider, and receives information from the infrastructure provider indicating whether the configuration is valid. The infrastructure receives a selection of one or more of the plurality of infrastructure providers to provision the one or more servers and requests the provisioning of the servers from the selected one or more of the plurality of infrastructure providers. The requests generally use the provider-specific specification files for the selected one or more of the plurality of infrastructure providers.

11 Claims, 6 Drawing Sheets

(58) Field of Classification Search
USPC .......................................................... 709/222
See application file for complete search history.

(56) References Cited

U.S. PATENT DOCUMENTS

| | | | |
|---|---|---|---|
| 2007/0234337 A1* | 10/2007 | Suzuki | G06F 8/61 |
| | | | 717/168 |
| 2011/0231280 A1 | 9/2011 | Farah | |
| 2011/0258080 A1 | 10/2011 | Lunenfeld | |
| 2013/0346260 A1* | 12/2013 | Jubran | G06F 9/5072 |
| | | | 705/28 |
| 2014/0310591 A1 | 10/2014 | Nguyen | |
| 2014/0380180 A1 | 12/2014 | Casalaina | |
| 2015/0301818 A1* | 10/2015 | Voronkov | G06F 8/65 |
| | | | 717/168 |
| 2016/0210578 A1* | 7/2016 | Raleigh | G06Q 10/06375 |

OTHER PUBLICATIONS

Bahrami, Mehdi. "Cloud Template, a Big Data Solution." arXiv preprint arXiv:1307.4716 (2013), pp. 13-17.
Wongthai, Winai et al. "A generic logging template for infrastructure as a service cloud." In Advanced Information Networking and Applications Workshops (WAINA), 2013 27th International Conference on, IEEE, 2013, pp. 1153-1160.

* cited by examiner

CLOUD SYSTEM ORDER AND CONFIGURATION USING CUSTOMIZED TEMPLATES

BACKGROUND

Embodiments presented herein relate to cloud services, and more specifically to provisioning hardware configurations for a variety of servers or server clusters using configuration templates.

Many providers of computing services generally are structured to provision "bare metal" servers based on a configuration. A bare metal server generally is a dedicated server in which resources are not shared by multiple users (e.g., through a set of virtual machines installed on the server). A configuration generally includes a number of servers, and each server configuration includes a specified CPU configuration (i.e., a type of CPU, speed, and number of CPU sockets), a specified amount of memory, storage space, network interfaces, and other server features. Typically, to provision a cluster of servers from an infrastructure provider, a user configures and requests provisioning of each server from the infrastructure provider individually.

Bare metal servers can be provided from multiple infrastructure providers. To determine which infrastructure provider offers a particular combination, a user may need to interact with each infrastructure provider to input individual server configurations with each provider. Based on the user-provided configuration, the user receives information from a cloud service provider whether the configuration is valid for that cloud service provider and, if the configuration is valid, pricing information for the configuration.

Performance metrics are generally monitored on a server or cluster of servers to determine resource utilization and usage patterns for the server. The performance metrics can be used to inform future orders. However, as with initial server orders, a user generally provides any subsequent server configuration requests individually for each server and from each cloud service provider.

SUMMARY

Another embodiment includes a computer-readable storage medium having instructions, which, when executed on a processor, performs an operation for brokering requests for one or more servers from a plurality of infrastructure providers. The operation generally includes receiving a template including configuration information for one or more servers. For each of the plurality of infrastructure providers, the infrastructure manager generates an infrastructure provider-specific specification based on the generic template, transmits the provider-specific specification file to the infrastructure provider, and receives information from the infrastructure provider indicating whether the configuration is valid. The infrastructure receives a selection of one or more of the plurality of infrastructure providers to provision the one or more servers and requests the provisioning of the servers from the selected one or more of the plurality of infrastructure providers. The requests generally use the provider-specific specification files for the selected one or more of the plurality of infrastructure providers.

Still another embodiment includes a processor and a memory storing a program, which, when executed on the processor, performs an operation for brokering requests for one or more servers from a plurality of infrastructure providers. The operation generally includes receiving a template including configuration information for one or more servers. For each of the plurality of infrastructure providers, the infrastructure manager generates an infrastructure provider-specific specification based on the generic template, transmits the provider-specific specification file to the infrastructure provider, and receives information from the infrastructure provider indicating whether the configuration is valid. The infrastructure receives a selection of one or more of the plurality of infrastructure providers to provision the one or more servers and requests the provisioning of the servers from the selected one or more of the plurality of infrastructure providers. The requests generally use the provider-specific specification files for the selected one or more of the plurality of infrastructure providers.

DETAILED DESCRIPTION

Figure 1:
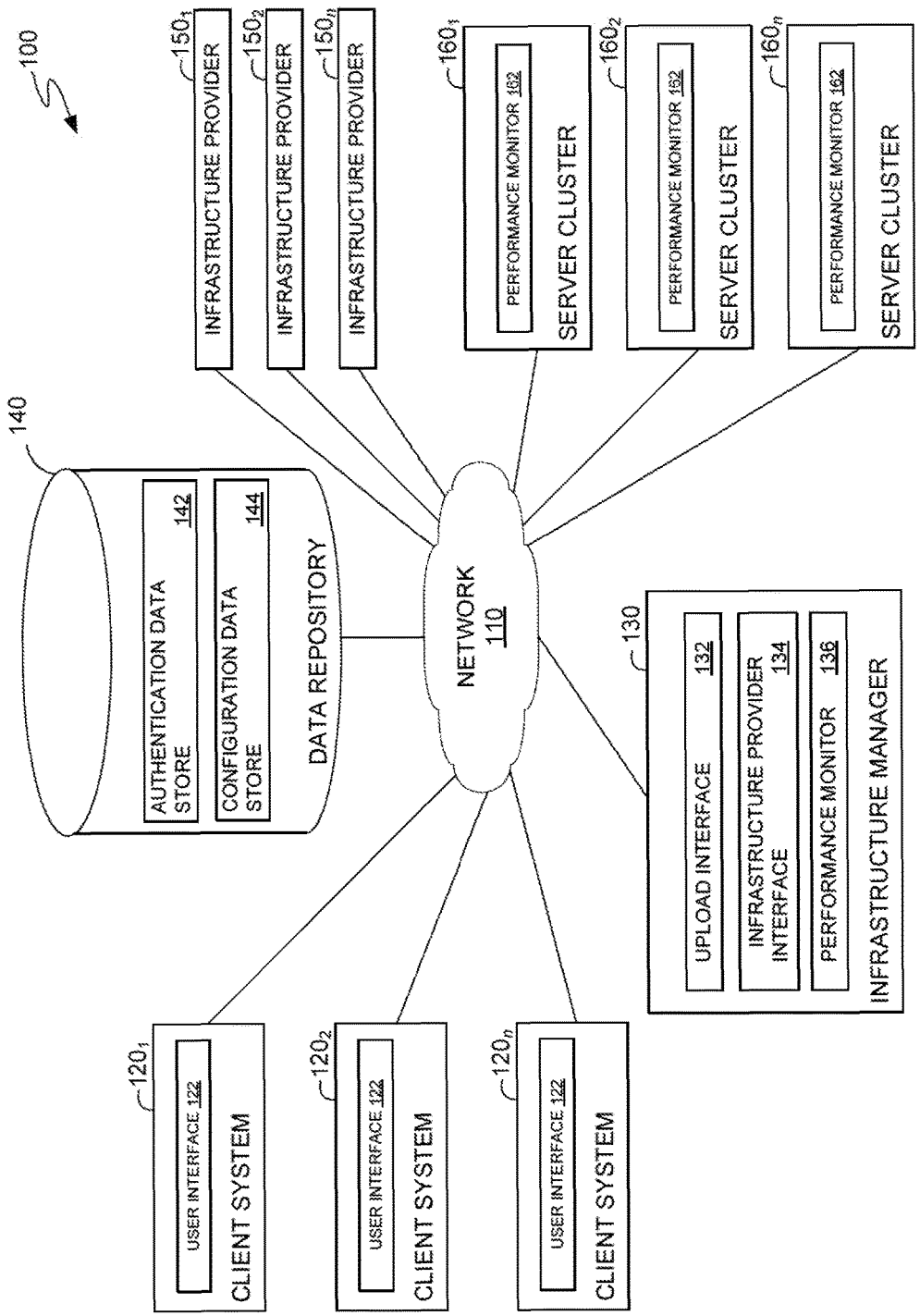
FIG. 1 illustrates an example of a networked computing environment, according to one embodiment.

Embodiments presented herein describe techniques for requesting one or more cloud service, or infrastructure, providers to provision cloud-based computing resources (e.g., a set of servers and/or clusters using generic configuration templates. A generic configuration template generally includes information, in an infrastructure provider neutral format, specifying the hardware and software components for a server. By using a generic configuration template, a system can generate infrastructure provider-specific configuration files that can be used to determine whether a user-specified configuration is a valid configuration for the infrastructure provider. If a configuration is a valid configuration the system provides information from the provider to a user. If a user decides to proceed with ordering a server or server cluster from the infrastructure provider, the system transmits the request to the infrastructure provider In one embodiment, an infrastructure management system includes interfaces for transmitting server configuration information to multiple infrastructure providers. For each infrastructure provider, the infrastructure management system generates provider-specific configuration information and transmits the provider-specific configuration information to the infrastructure provider to determine whether the configuration is valid and obtain other information from the infrastructure provider (e.g., pricing information). Based on user input, the infrastructure management system can request provisioning of multiple servers or multiple server clusters from any number of infrastructure providers.

In one embodiment, performance monitors may be loaded onto each provisioned server or server cluster. Over time, the performance monitors monitor hardware usage patterns on the provisioned server or server clusters. For example, the performance monitors could monitor CPU utilization versus an optimal amount of CPU utilization. If hardware usage is high (e.g., exceeds a threshold), the performance monitors can use the information to generate a configuration template for a more highly specified server or server cluster than the configuration used to provision the current server or server cluster. If hardware usage is low (e.g., falls below a threshold), the performance monitors can generate a configuration template for a server with less powerful hardware than the configuration used to provision the current server or server cluster.

Advantageously, using generic configuration templates to request the provisioning of servers and server clusters allows a user to request provisioning of servers or server clusters from multiple infrastructure providers. Additionally, linking performance monitors to the provisioned servers or server clusters allows an infrastructure management system to recommend or optimize future configurations for the servers or server clusters based on the monitored performance. The recommended configurations can be provisioned through the infrastructure management system, and further recommendations can be made to adjust the capabilities of the servers or server clusters as usage changes.

FIG. 1 illustrates an example computing environment, according to one embodiment. As shown, the computing environment includes a plurality of client devices 120, an infrastructure manager 130, a data store 140, a plurality of infrastructure providers 150, and a plurality of server clusters 160, connected to a network 110.

Each of the plurality of client devices 120 allow a user to access an infrastructure manager 130 to request the provisioning of servers or server clusters from one or more infrastructure providers 150. Each client device includes a user interface 122. User interface 122 allows a user to upload a generic template specifying a server or server cluster configuration to the infrastructure manager 130 and request the provisioning of a server or server cluster 160 from one or more infrastructure providers 150. As performance data is gathered from performance monitors 162 installed on the servers or server clusters 160, a user can view a recommended configuration based on the gathered performance data and request the provisioning of a new server or server cluster 160 based on the recommended configuration.

Infrastructure manager 130 is generally configured to act as a broker between client devices 120 and infrastructure providers 150. By acting as a broker, infrastructure manager 130 may receive requests for servers or server clusters from a client device 120 and transmit the requests to one or more infrastructure providers 150, as described in further detail herein. As illustrated, infrastructure manager 130 includes an upload interface 132, an infrastructure provider interface 134, and a performance monitor 136. Upload interface 132 is generally configured to allow a user to upload one or more template files to infrastructure manager 130 that are used to determine whether an infrastructure provider supports the specified server or server cluster configuration. In an example, upload interface 132 provides an FTP server interface and allows a user to define directories in configuration data 144 of data repository 140 corresponding to different types of servers or server clusters to be provisioned from a template. For example, in a large-scale build environment, one directory could contain a configuration for a data storage cluster; a second directory could contain configuration data for a build cluster; a third cluster could contain configuration for development machines; and so on.

In some embodiments, upload interface 132 may allow a user to access only directories that belong to the user. For example, a user accessing infrastructure manager 130 may be prompted to log into the system using a set of credentials (e.g., a username and password combination). The credentials may be stored, for example, in an authentication data store 142 in data repository 140. Based on information about the user, upload interface 132 could allow a user to create new directories (corresponding to new classes of servers or server clusters to be provisioned for the user) or view directories that the user had already completed. However, the user may not be allowed to interact with directories that belong to other users.

Generic templates uploaded by a user to configuration data store 144 may generally define a requested hardware configuration and are generally infrastructure provider-agnostic. The generic templates may be structured, for example, as XML (Extendible Markup Language) documents or JavaScript Object Notation (JSON) documents. Each template may include, for example, a hardware configuration for a server or server cluster, including data indicating a number of servers to be provisioned, processor information (e.g., CPU type and speed), RAM information (e.g., amount of RAM, RAM type, and speed), storage information (e.g., drive types (i.e., hard disk drive, solid state drive, or hybrid) and RAID configurations), network capabilities, and other information. In some embodiments, the generic templates may also include software configuration information, such as a type of hypervisor or operating system to be installed on the server or on each server in the cluster.

Infrastructure provider interface 134 may create provider-specific configuration files from the generic templates uploaded to infrastructure manager 130 via upload interface 132. Using the provider-specific configuration files, infrastructure provider 130 (e.g., via infrastructure provider interface 134) obtains information from each infrastructure provider and transmits orders to a selected number of infrastructure providers to provision one or more servers or server clusters.

In some embodiments, infrastructure provider interface 134 begins the ordering process by transmitting provider-specific configuration files, generated from the generic templates, to multiple infrastructure providers 150. If an infrastructure provider 150 does not support the hardware and/or software configuration requested by a user, infrastructure provider interface 134 can indicate to client system 120 that the configuration is not available from a given infrastructure provider. Otherwise, infrastructure provider interface obtains information about the configuration from the given infrastructure provider 150 and transmits the information to client system 120. In some embodiments, the information may list the requested hardware and/or software configuration, as well as pricing information.

Through user interface 122, a user can request the provisioning of a server or server cluster from one or more infrastructure providers 150, based on the information transmitted by infrastructure provider interface 134 to the user interface 122 on client system 120. Infrastructure provider interface 134 receives data from a user identifying the infrastructure provider(s) 150 selected to provision a server or server cluster. Infrastructure provider interface 134 then transmits requests to the identified infrastructure provider(s) 150 to provision a server or server cluster 160 based on the associated configuration. In some embodiments, infrastructure provider interface 134 can order multiple servers by submitting multiple orders, one at a time, until infrastructure provider 134 requests the provisioning of a desired number of servers from infrastructure provider 150.

Performance monitor 136 communicates with performance monitors 162 installed on servers or server clusters 160 to monitor and log the performance of a server or server cluster. Over time, performance monitor 136 can compare average resource utilization of a given server or server cluster 160 to a target resource utilization. If resource utilization consistently falls below the target resource utilization, performance monitor 136 can recommend a less highly specified server or server cluster configuration to the user. Likewise, if resource utilization consistently exceeds the target resource utilization, performance monitor 136 can recommend a more highly specified server or server cluster configuration to the user.

In some embodiments, performance monitor 136 can access the generic template corresponding to the configuration of a server or server cluster 160 from configuration data store 144. Using the performance data (e.g., resource utilization), performance monitor 136 can generate an updated generic template reflecting the recommended adjustments to the current configuration of server or server cluster 160. For example, if performance monitor 136 detects that average processor utilization is below a set value, performance monitor 136 generates a configuration file with slower CPUs. In another example, if performance monitor 136 detects high RAM usage and memory access latency, performance monitor 136 generates a configuration file with more RAM with a lower latency rating.

When performance monitor 136 generates a recommended configuration for a future server or server cluster, performance monitor 136 can save the recommended configuration template to configuration data store 144 and inform the user that a recommended configuration is awaiting review by causing a notification to be displayed in user interface 122. A user can view the recommended configuration, determine which infrastructure providers are able to provide a server or server cluster based on the recommended configuration, and request the provisioning of a server or server cluster based on the recommended configuration from one or more infrastructure providers as if the configuration were an original order.

Infrastructure manager 130 can generate and recommend configurations for different users operating on similar usage models or executing the same or similar tasks. In some cases, infrastructure manager 130 can generate a set of default recommended configuration templates for different usage models sets of tasks. When a user accesses infrastructure manager 130 through a user interface 122 on client system 120, infrastructure manager 130 can present a "guided mode" interface to the user, which allows the user provide an intended use for a server cluster or projected usage information. Based on the user-provided information, infrastructure manager 130 selects one or more default recommended configurations to present to the user. The user can either request the provisioning of servers or server clusters from one or more infrastructure providers 150 based on the recommended configurations or modify the configuration and request the provisioning of servers or server clusters based on the modified configuration.

Data repository 140 may be a database and may contain information used in infrastructure manager 130 for ordering servers and server clusters from one or more of a plurality of infrastructure providers. Data repository 140 may include an authentication data store 142 and a configuration data store 144.

Authentication data store 142 generally includes a plurality of entries defining user accounts for infrastructure manager 130. A user account generally includes, for example, a user name, password, and billing information. In some embodiments, authentication data store 142 may further include additional security information, such as a linked pseudorandom login token or biometric data.

Configuration data store 144 generally provides a repository in which generic configuration templates are stored. In an embodiment, configuration data store 144 includes a plurality of directories in which users can upload generic templates corresponding to a desired hardware and/or software configuration for a server or server cluster. Each directory may be associated with user information in authentication data store 142, and only the user associated with the directory may access the directory (i.e., view and/or modify previous generic configuration templates; add new generic configuration templates to the directory; or view recommended configurations for future orders).

In an embodiment, directories on configuration data store 144 may correspond to different types of machines to be provisioned from one or more infrastructure providers 150. For example, for a development system, a user could create different directories for management nodes, guest nodes, storage nodes, and network nodes in configuration data store 144. For each type of machine, the user then uploads one or more generic templates to the corresponding directory.

In an embodiment, performance monitor 136 can access generic templates from configuration data store 144. As discussed above, performance monitor 136 can monitor various performance metrics from performance monitor 162 installed on each server or server cluster 160 and generate a recommended server or server cluster configuration from the current configuration of the server or server cluster. The recommended configuration can be stored in the appropriate directory in configuration data store 144

Infrastructure providers 150 generally include an interface for receiving a provider-specific configuration file from infrastructure manager 130. Based on the provider-specific configuration file, infrastructure provider 150 verifies whether or not the infrastructure provider can provide the specified server or server cluster 160. After verifying whether or not the infrastructure provider 150 can provide the specified server or server cluster 160, transmits information to infrastructure manager 130 indicating whether the infrastructure provider can provide the specified server or server cluster 160 and other information, such as the price of the specified server or server cluster.

Infrastructure providers 150 receive orders from infrastructure manager 130. Such orders may include a quantity and hardware and/or software specification of the machines to be provisioned. Each infrastructure provider 150 that receives an order from infrastructure manager 130 confirms the order and may additionally provide a projected time at which the machines provisioned by infrastructure provider 130 will be ready for use.

Each server cluster 160 may be provisioned from one of the plurality of infrastructure providers 150. When a server cluster 160 is provisioned and made available for use, a user can install one or more performance monitors 162 onto the server cluster. The performance monitors generally are configured to log performance data, such as CPU usage, memory usage, network latency, and other performance metrics, and send the performance data to performance monitor 136 for analysis. As discussed above, based on the performance data logged from performance monitors 162, infrastructure manager 130 can recommend a different server configuration to a user. The recommended server configurations may provide a more highly specified server or server cluster if the performance data indicates high resource utilization, or a less highly specified server or server cluster if the performance data indicates low resource utilization.

Figure 2:
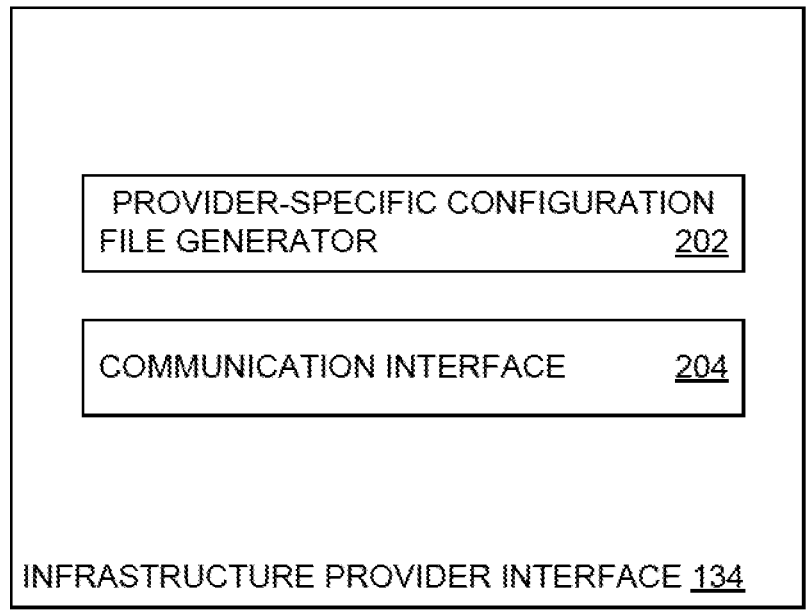
FIG. 2 is a block diagram illustrating an example infrastructure provider interface, according to one embodiment.

FIG. 2 illustrates an example block diagram of an infrastructure provider interface 134, according to some embodiments. As illustrated, infrastructure provider interface may include a provider-specific configuration file generator 202 and a communication interface 204.

Provider-specific configuration file generator 202 retrieves one or more generic templates from configuration data store 144 based on user input specifying one or more servers or server clusters to be provisioned through infrastructure manager 130. For each infrastructure provider 150, provider-specific configuration file generator 202 generates a provider-specific configuration file that can be transmitted to a specific infrastructure provider. The provider-specific configuration file generally includes the configuration information specified in the generic template. In an example, the generic template could specify a quantity of a particular CPU model, and the provider-specific configuration file generator 202 transmits such information to an infrastructure provider 150 as a quantity of items with a provider-specific identifier (e.g., a stock keeping unit).

After provider-specific configuration file generator 202 generates a provider-specific configuration file to be transmitted to a specific infrastructure provider 150, the file is transmitted to an infrastructure provider 150 via communication interface 204. In an embodiment, communication interface 204 transmits a configuration file to a specific infrastructure provider 150 using an hypertext transport protocol (HTTP) interface. For example, each infrastructure provider 150 may include a REST URL, and communication interface 204 can transmit a server configuration to infrastructure provider 150 using an HTTP POST procedure to the REST URL.

Communication interface 204 generally receives information from an infrastructure provider 150 that indicates whether or not the infrastructure provider 150 can provide the specified server or server cluster, and if so, pricing information and other information to be displayed to a user. When a user places an order to provision a server or server cluster from a specific infrastructure provider 150, communication interface 204 transmits the order to infrastructure provider 150 and receives information indicating that the order was successfully received and (optionally) when the ordered server or server cluster will be available for use.

Figure 3:
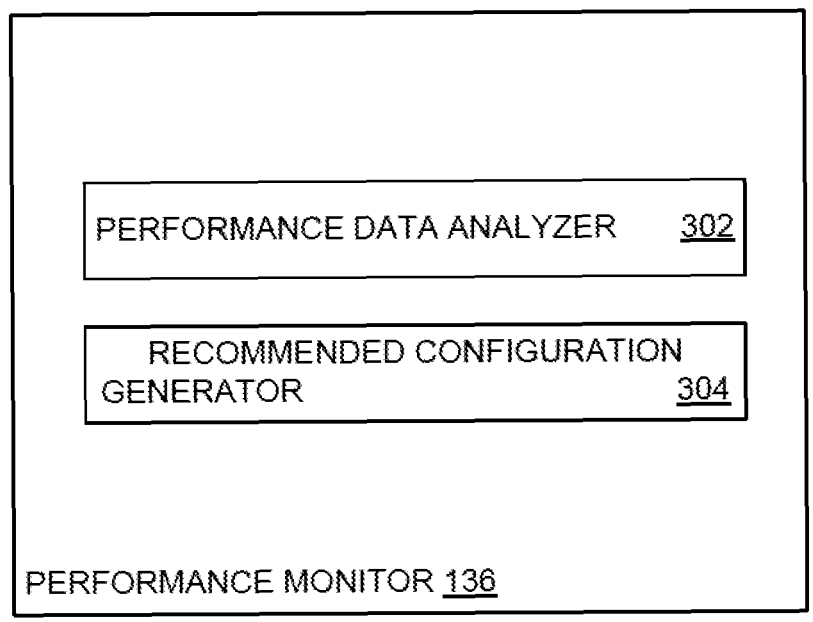
FIG. 3 is a block diagram illustrating a performance monitor for a server cluster provisioned from a generic template, according to one embodiment.

FIG. 3 illustrates a block diagram of an example performance monitor 136, according to some embodiments. As illustrated, performance monitor 136 may include a performance data analyzer 302 and a recommended configuration generator 204.

Performance data analyzer 302 may interface with performance monitors 162 on servers or server clusters 160 provisioned through infrastructure manager 130 to obtain historical resource utilization data for a particular server cluster 160. After receiving historical resource utilization data from one or more servers or server clusters 160, performance data analyzer 302 compares the historical resource utilization data to resource utilization thresholds. In some cases, performance data analyzer compares historical utilization data to a high utilization set point value and a low utilization threshold value. If historical resource utilization exceeds the high utilization threshold value, performance monitor 134 determines that the server or server cluster should have additional computing resources. Likewise, if historical resource utilization falls below the low utilization threshold value, performance monitor performance monitor determines that the server or server cluster has more computing resources than it needs.

Based on the comparisons between historical resource utilization data and resource utilization threshold, recommended configuration generator 304 generates a template file, to be stored in configuration data store 144, with the recommended configuration. If performance monitor 134 determines that historical resource utilization exceeds a high resource utilization threshold value (and thus that the server or server cluster should have additional computing resources), recommended configuration generator 304 generates a template with additional computing resources. For example, if processor utilization exceeds a high utilization set point, recommended configuration generator 304 can generate a configuration template with additional physical processors, more powerful processors, or both. Likewise, if processor utilization falls below a low utilization set point, recommended configuration generator 304 can generate a configuration template with fewer physical processors, less powerful processors, or both.

Recommended configuration generator 304 saves the generated template file to configuration data store 144 and may indicate to a user that infrastructure manager 130 has generated a recommended configuration for future servers or server clusters. As discussed above, a user can view the recommended configuration template and request the provisioning of the recommended configuration (or a configuration based on the recommended configuration) from one or more infrastructure providers 150.

Figure 4:
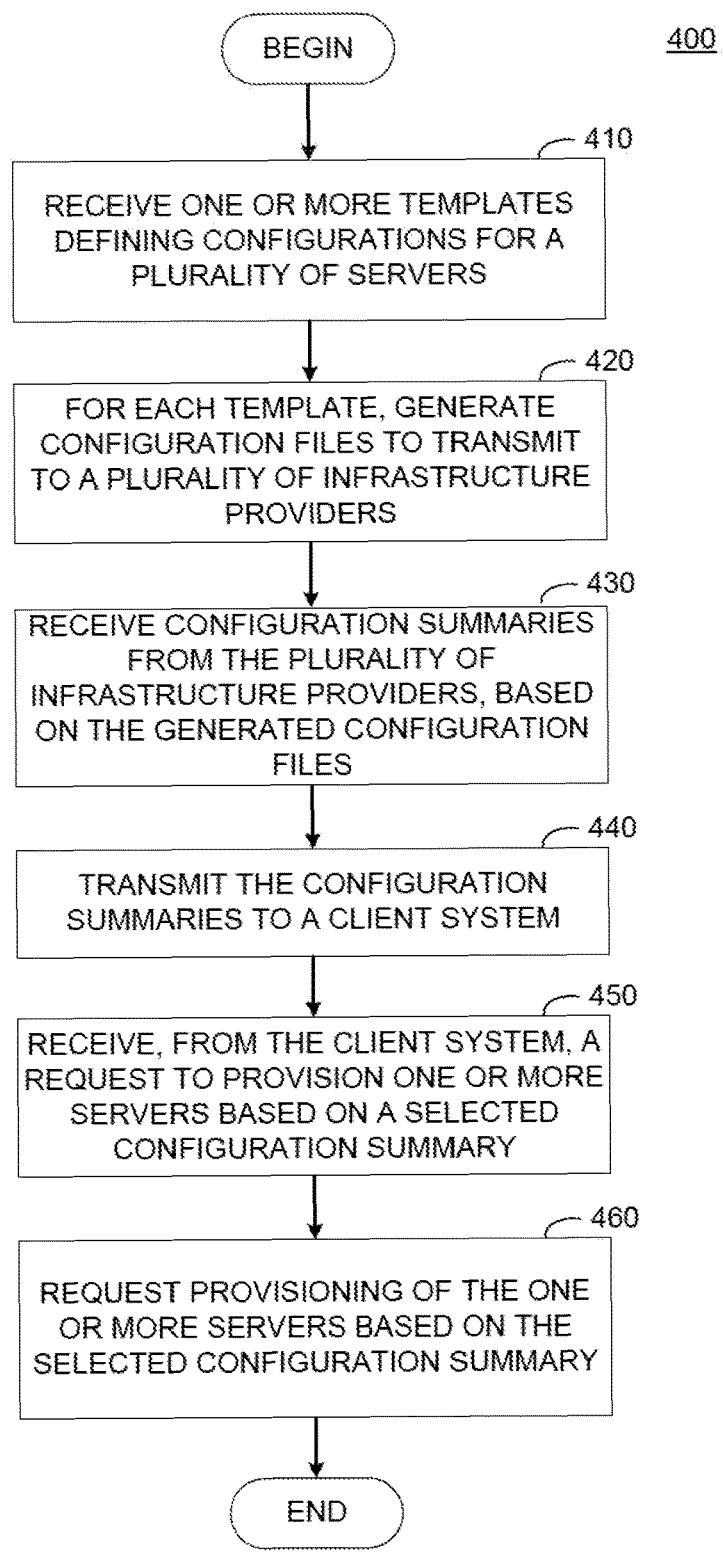
FIG. 4 illustrates a method for requesting the provisioning of a server cluster using generic templates, according to one embodiment.

FIG. 4 illustrates an example method 400 for requesting the provisioning of one or more servers or server clusters based on a generic configuration template, according to some embodiments. Method 400 begins at step 410, where the infrastructure manager receives one or more templates defining configurations for a plurality of servers. As discussed above, each generic configuration template may be, for example, an XML or JSON document containing information about a number of servers to be requested for a particular type of machine and a hardware and/or software configuration for each of the servers. The generic configuration templates are received, in some embodiments, via an FTP connection between a client device and the infrastructure manager.

At step 420, the infrastructure manager generates configuration files to transmit to a plurality of infrastructure providers for each received template. Each configuration file generally contains the configuration defined in a generic template in a provider-specific format. For example, as discussed above, a configuration file generated for an infrastructure provider may include a SKU or other provider-specific identifier corresponding to a particular piece of hardware (e.g., a CPU, storage, etc.). When the provider-specific configuration file is generated, the infrastructure manager transmits the configuration file to the corresponding infrastructure provider.

At step 430, the infrastructure manager receives configuration summaries from the plurality of infrastructure providers, based on the generated configuration files. In an embodiment, the configuration summaries include information about whether or not the infrastructure provider can fulfill an order for a server or server cluster based on the configuration. Additionally, if an infrastructure provider can fulfill an order for a server or server cluster based on the configuration, the configuration summaries include other information to be displayed to a user, such as pricing and projected availability. Method 400 proceeds to step 440, where the infrastructure manager transmits the configuration summaries to a client system.

At step 450, the infrastructure manager receives, from the client system, a request to provision one or more servers based on a selected configuration summary. The request may identify a single infrastructure provider to provision the one or more servers or multiple infrastructure providers to provision different parts of an overall server system. At step 460, the infrastructure requests provisioning of the one or more server based on the selected configuration summary. As discussed above, in some cases, infrastructure manager can submit a batch order of multiple servers to an infrastructure provider by repeatedly submitting requests and a configuration file to the infrastructure provider.

Figure 5:
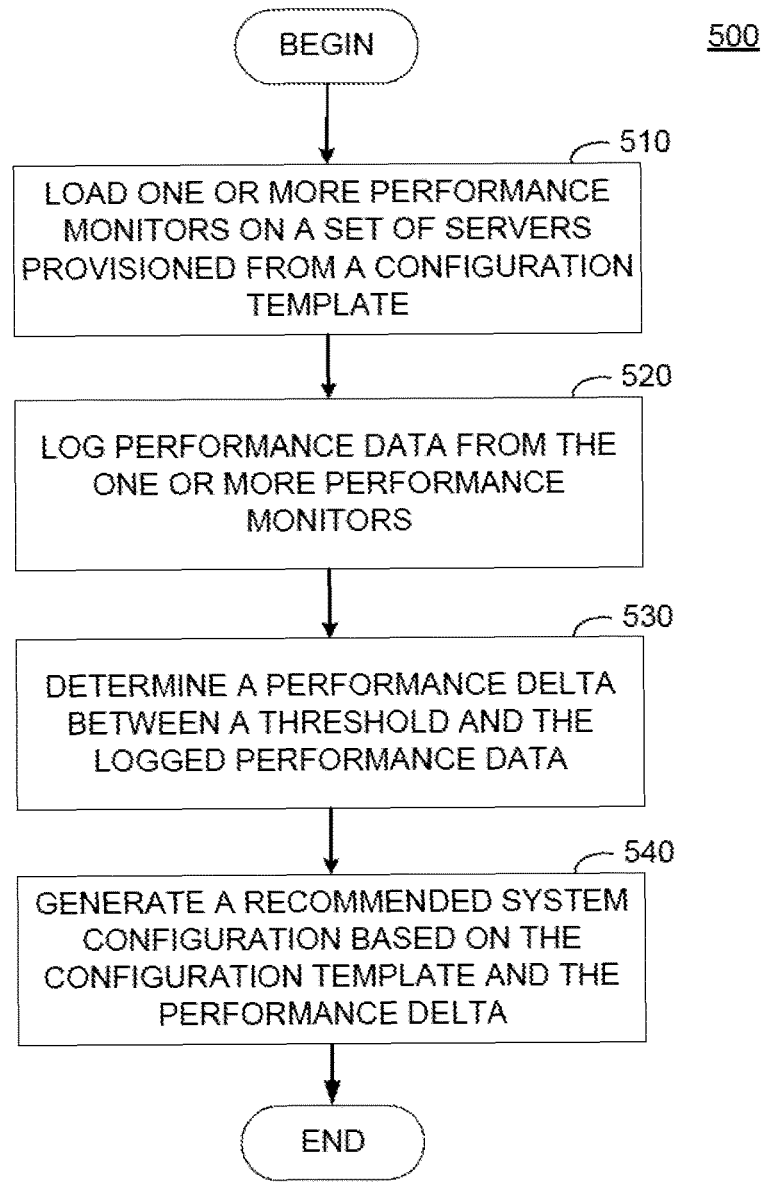
FIG. 5 illustrates a method for generating a configuration template for a server cluster based on a current configuration and performance data, according to one embodiment.

FIG. 5 illustrates an example method 500 for generating a recommended server configuration based on performance information and the current configuration server configuration, according to an embodiment. Method 500 begins at step 510, where the infrastructure manager loads one or more performance monitors on a set of servers provisioned from a configuration template. The performance monitors may include, for example, CPU usage monitors, memory usage monitors, storage monitors, network activity monitors, and so on.

At step 520, the infrastructure manager logs performance data from the one or more performance monitors. The performance data can be logged, for example, on files at the server or on the infrastructure manager itself. At step 530, the infrastructure manager determines a performance delta between a threshold and the logged performance data. As discussed above, in an example, performance deltas can be measured against a high resource utilization threshold (e.g., a positive delta between logged performance data and a threshold) and a low resource utilization threshold (e.g., a negative delta between logged performance data and a threshold). Method 500 proceeds to step 540, in which the infrastructure manager generates a recommended system configuration based on the configuration template and the performance delta. As discussed above, if the logged resource utilization data exceeds a high resource utilization threshold, the infrastructure manager generates a recommended system configuration with additional computing resources in comparison to the current configuration template. Likewise, if the logged resource utilization data falls below a low resource utilization threshold, the infrastructure manager generates a recommended system configuration with fewer computing resources in comparison to the current configuration template.

Figure 6:
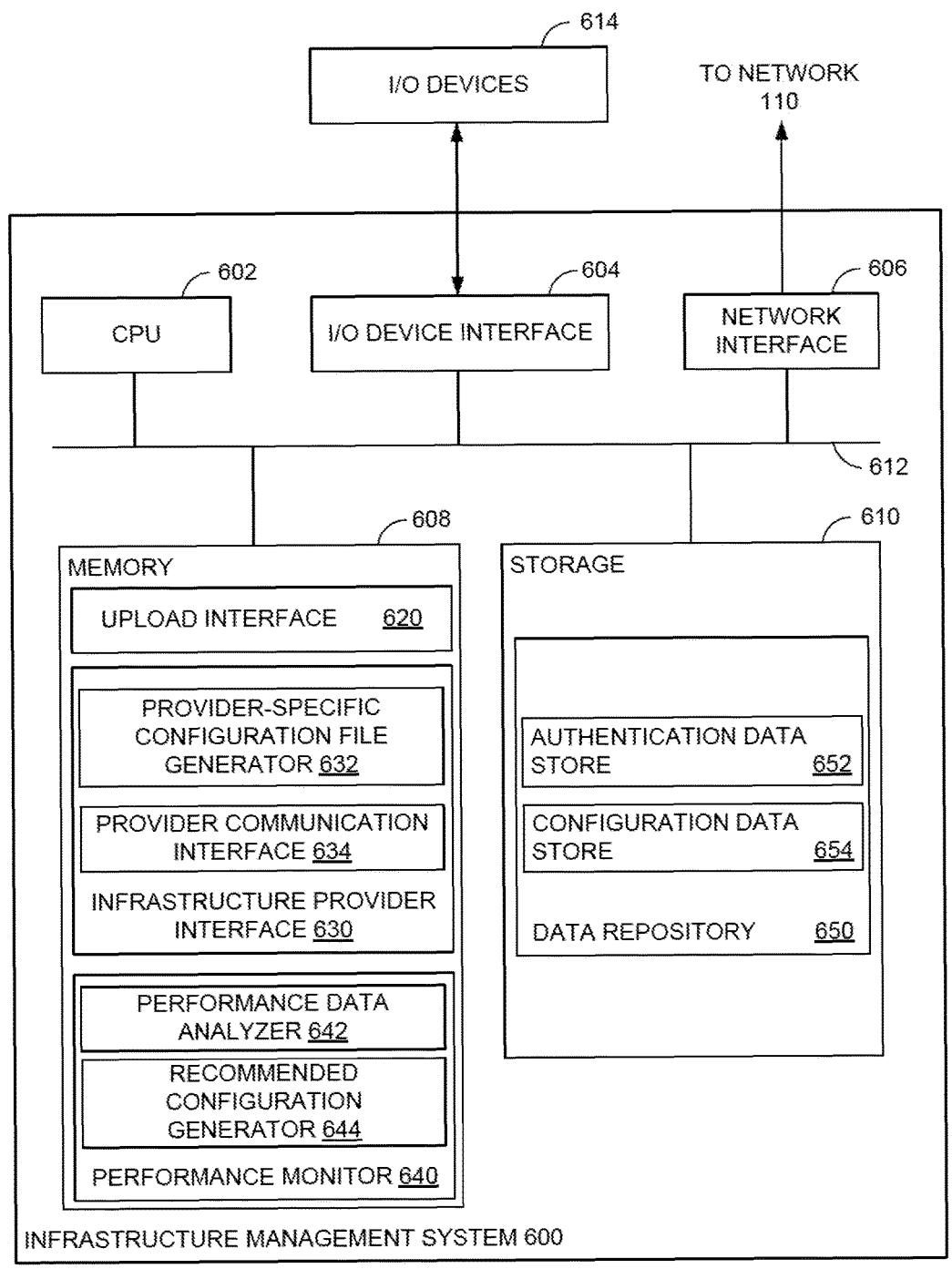
FIG. 6 illustrates an example computing system for using customized templates for the provisioning of servers and server clusters, according to one embodiment.

FIG. 6 illustrates an example infrastructure management system 600 that uses generic templates to request the provisioning of servers and/or server clusters from a plurality of infrastructure providers, according to an embodiment. As shown, the infrastructure management system includes, without limitation, a central processing unit 602, one or more I/O device interfaces 604, which may allow for the connection of various I/O devices 614 (e.g., keyboards, displays, mouse devices, pen input, etc.) to the entity analytics system 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an upload interface 620, an infrastructure provider interface 630, and a performance monitor 640. As discussed above, upload interface may be configured to receive, from a client device, uploads of a plurality of generic configuration templates corresponding to server or server cluster configurations. The received generic configuration templates are stored in data repository 650 (specifically, in configuration data store 654) for future use.

Infrastructure provider interface 630, as shown, includes a provider-specific configuration file generator 632 and a provider communication interface 634. The provider-specific configuration file generator 632 is generally configured to read a received generic template and generate a provider-specific configuration file based on the data contained in the generic template. The provider-specific configuration files are transmitted to an infrastructure provider via provider communication interface 634. As discussed above, provider communication interface 634 can transmit a configuration file to an infrastructure provider using, for example, a REST interface on HTTP. In response, provider communication interface 634 can receive information indicating whether or not the infrastructure provider is able to provision a server according to the specified configuration, as well as information such as pricing or availability to be displayed to a user. In response to user selection of one or more infrastructure providers for provisioning a server or server cluster, provider communication interface 634 can transmit an order, including the configuration file, to the infrastructure provider. For infrastructure providers that do not support batch ordering, provider communication interface 634 may be configured to transmit orders individually until a desired number of servers or server clusters have been ordered.

Performance monitor 640, as shown, includes performance data analyzer 642 and recommended configuration generator 644. Performance data analyzer 642 is generally configured to obtain logged performance (e.g., resource utilization) data from one or more servers or server clusters and compare the logged data to performance threshold. As discussed above, performance data analyzer can compare resource utilization data to high utilization and low utilization set points. The calculated performance deltas between resource utilization and the high and low utilization threshold are used by recommended configuration generator 644 to generate a configuration template that can be presented to a user for future orders. As discussed above, if resource utilization exceeds the high resource utilization threshold, recommended configuration generator 644 can generate a configuration template with additional computing resources in relation to the current configuration. Likewise, if resource utilization falls below the low resource utilization threshold, recommended configuration generator 644 can generate a configuration template with fewer computing resources in relation to the current configuration.

As shown, storage 610 includes a data repository 650, which, in some embodiments, may be a relational database. Data repository 650 includes authentication data store 652 and configuration data store 654. As discussed above, authentication data store 652 contains information that defines a user and the configuration files and directories that the user is allowed to read, modify, and write. Configuration data store 654 contains the generic templates uploaded by a user through upload interface 620 and recommended configurations generated by recommended configuration generator 644.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium having computer readable program code embodied therewith, the computer readable program code configured to perform an operation for brokering requests for one or more servers from a plurality of infrastructure providers, the operation comprising:
   receiving a generic template including configuration information for one or more servers;
   for each of the plurality of infrastructure providers:
      generating an infrastructure provider-specific specification file based on the generic template, the provider-specific specification file including provider-specific identifiers for computing resources identified in the generic template,
      transmitting the provider-specific specification file to the infrastructure provider,
      receiving information from the infrastructure provider indicating whether the configuration is valid, and
      in response to receiving an indication that the configuration is valid, displaying information about the infrastructure provider to a user for selection;
   receiving a selection of one or more of the plurality of infrastructure providers to provision the one or more servers;
   requesting the provisioning of the servers from the selected one or more of the plurality of infrastructure providers using the provider-specific specification files for the selected one or more of the plurality of infrastructure providers,
   monitoring performance of the provisioned one or more servers;
   modifying the configuration information in the generic template to reflect recommended adjustments to the configuration information based on the monitored performance; and
   presenting the updated generic template to the user for a subsequent provisioning of one or more servers.

2. The non-transitory computer readable medium of claim 1, wherein the operations further comprise:
   logging performance information from performance monitors loaded onto the servers.

3. The non-transitory computer readable medium of claim 2, wherein the operations further comprise:
   generating a recommended configuration based on the logged performance information; and
   saving a second template reflecting the recommended configuration.

4. The non-transitory computer readable medium of claim 3, further comprising:
   providing the second template to a user; and
   receiving a request to provision one or more servers based on the second template.

5. The non-transitory computer readable medium of claim 3, further comprising:
   associating a usage model to the second template.

6. The non-transitory computer readable medium of claim 5, further comprising:
   receiving, from a user, information about an intended usage model for a server; and
   providing the second template to the user if the usage model matches the intended usage model.

7. A system comprising:
a processor; and
a memory storing one or more instructions, which, when executed by the processor, performs an operation for brokering requests for one or more servers from a plurality of infrastructure providers, the operation comprising:
   receiving a generic template including configuration information for one or more servers;
   for each of the plurality of infrastructure providers:
      generating an infrastructure provider-specific specification file based on the generic template, the provider-specific specification file including provider-specific identifiers for computing resources identified in the generic template,
      transmitting the provider-specific specification file to the infrastructure provider,
      receiving information from the infrastructure provider indicating whether the configuration is valid, and
      in response to receiving an indication that the configuration is valid, displaying information about the infrastructure provider to a user for selection;
   receiving a selection of one or more of the plurality of infrastructure providers to provision the one or more servers;
   requesting the provisioning of the servers from the selected one or more of the plurality of infrastructure providers using the provider-specific specification files for the selected one or more of the plurality of infrastructure providers,
   monitoring performance of the provisioned one or more servers;
   modifying the configuration information in the generic template to reflect recommended adjustments to the configuration information based on the monitored performance; and
   presenting the updated generic template to the user for a subsequent provisioning of one or more servers.

8. The system of claim 7, wherein the operations further comprise:
   logging performance information from performance monitors loaded onto the servers.

9. The system of claim 8, wherein the operations further comprise:
   generating a recommended configuration based on the logged performance information; and
   saving a second template reflecting the recommended configuration.

10. The system of claim 9, wherein the operations further comprise:
   providing the second template to a user; and
   receiving a request to provision one or more servers based on the second template.

11. The system of claim 9, wherein the operations further comprise:
   associating a usage model to the second template;
   receiving, from a user, information about an intended usage model for a server; and providing the second template to the user if the usage model matches the intended usage model.

\* \* \* \* \*